(12) United States Patent
Kato et al.

(10) Patent No.: US 7,593,566 B2
(45) Date of Patent: Sep. 22, 2009

(54) DATA RECOGNITION DEVICE

(75) Inventors: Noriji Kato, Kanagawa (JP); Hirotsugu Kashimura, Kanagawa (JP); Hitoshi Ikeda, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 863 days.

(21) Appl. No.: 10/940,983

(22) Filed: Sep. 15, 2004

(65) Prior Publication Data

US 2005/0058339 A1    Mar. 17, 2005

(30) Foreign Application Priority Data

Sep. 16, 2003    (JP)    ............... 2003-323759

(51) Int. Cl.
  *G06K 9/00*    (2006.01)

(52) U.S. Cl. .................. 382/159; 382/103; 382/190; 345/441; 348/169

(58) Field of Classification Search .............. 382/100, 382/118, 103, 199, 209, 197, 195, 130, 205, 382/224, 228, 248, 210, 203, 206, 165, 190, 382/225, 217, 218, 221, 159; 244/3.16; 704/8, 704/3, 10, 277, 238, 235, 251, 256, 256.1, 704/260; 345/441; 342/192; 250/203.1; 356/141.5; 348/87, 169, 144, 526; 364/725

See application file for complete search history.

(56) References Cited

U.S. PATENT DOCUMENTS

| | | | | |
|---|---|---|---|---|
| 5,771,307 A | * | 6/1998 | Lu et al. | 382/116 |
| 5,842,194 A | * | 11/1998 | Arbuckle | 706/52 |
| 5,844,573 A | * | 12/1998 | Poggio et al. | 345/441 |
| 5,852,672 A | * | 12/1998 | Lu | 382/154 |
| 6,075,557 A | * | 6/2000 | Holliman et al. | 348/51 |
| 6,345,109 B1 | * | 2/2002 | Souma et al. | 382/118 |
| 6,633,655 B1 | * | 10/2003 | Hong et al. | 382/118 |
| 6,862,374 B1 | * | 3/2005 | Nagai et al. | 382/285 |
| 2002/0122593 A1 | | 9/2002 | Kato et al. | |

* cited by examiner

*Primary Examiner*—Sheela C Chawan
(74) *Attorney, Agent, or Firm*—Oliff & Berridge, PLC

(57) ABSTRACT

A data recognition device including: a recognizing unit that specifies, out of processing target data that changes in time series, predetermined recognition target data parts from the first to the n-th in order by searching a recognition target data part from the processing target data by use of a processing parameter; a storing unit that stores, as recognition related information, a processing parameter that is used when the i-th ($1 \leq i < n$) recognition target data part is specified; and a processing parameter setting unit that generates a processing parameter to be used in recognizing the i+1-th recognition target data part and outputs the generated processing parameter to the recognizing unit.

6 Claims, 12 Drawing Sheets

INPUT LAYER | INTERMEDIATE LAYER | OUTPUT LAYER

LEARNING SAMPLES OF THE
FIRST IMAGE DEFORMATION
DEGREE ESTIMATING PORTION

LEARNING SAMPLES OF THE
SECOND IMAGE DEFORMATION
DEGREE ESTIMATING PORTION

ROTATION   SHIFT

DATA RECOGNITION DEVICE

BACKGROUND OF THE INVENTION

1. Field of the Invention

The present invention relates to a data recognition device for recognizing, out of processing target data such as an image or voice, a recognition target data part corresponding to preset reference data.

2. Description of the Related Art

A processing of recognizing an image which has become a target of recognition, such as an object and a human face, by using the image as reference data can in principle be realized by a processing of calculating the degree of similarity of image data of a processing target to the pre-stored reference data.

However, actual images of recognition targets greatly differ depending on the environmental conditions such as their directions, distances, and lighting. Therefore, it is necessary to retain enormous quantity of data according to the degrees of freedom of these images, and the volume of calculation with them also results in an enormous quantity, therefore, realization is difficult.

Therefore, by carrying out a "normalization" processing for geometrically converting the recognition target image candidates to a predetermined positions, tilts, and sizes, the quantity of reference data of a reference target can be reduced, and the calculation volume according thereto can also be reduced.

Here, as a processing method for normalization, known is a method of extracting predetermined feature points from the processing target image data and adapting the feature points to a pre-arranged normalized image shape model. Here, for the feature points, a method using edge operators is commonly employed, however, for an object such as a human face whose surface shape is smooth, a clear edge cannot always be obtained, and because the edge itself is easily affected by the lighting condition, this is often inappropriate.

For this, a below identified document (hereinafter referred to as "document Rowley") discloses a technique of directly detecting a deviation from a normalized image based on a shading pattern of image data of a processing target and carrying out a normalization processing by use of the detection result.

Document Rowley: Rotation Invariant Neural Network-Based Face Detection, H. A. Rowley, S. Baluja, and T. Kanade, Proceedings of IEEE Conference on Computer Vision and Pattern Recognition, 1998, pp. 38-44

SUMMARY OF THE INVENTION

However, for utilizing the technique disclosed in the document Rowley, it is necessary to accurately estimate, for example, an angle indicating a tilt with respect to all angle directions. Namely, for utilizing the technique described in the document Rowley, it is necessary to prepare a large number of learning samples, and a processing burden required for learning is great.

Furthermore, although, in the document Rowley, only the rotation within an image plane has been disclosed as a deformation degree of freedom of the processing target image, since a large number of degrees of freedom such as a rotation in the depth direction, size, position, lighting, etc., exist in the deformation degrees of freedom of an actual image, the burden for learning becomes still greater, and it becomes difficult to complete the learning processing within a realistic time.

This circumstance becomes more of a problem in a case where data involving a time change such as a moving image becomes a processing target. For example, a technique by using information among frames as a processing to detect a facial part from a moving image in real time is disclosed in JP-A-2002-269546. According to the technique described in JP-A-2002-269546, once the face is detected from one of the still image frames composing a moving image, to the subsequent frame, a two-dimensional facial image with a parallel shift and a rotation from the position of the detected face is generated, and the image is used as reference data to carry out matching.

However, according to the above method, it is impossible to continue recognizing the face by matching unless reference data is generated for all degrees of freedom such as a face shift, rotation, and size. Therefore, for this face recognition, if the conventional face recognizing processing as disclosed in the document Rowley is carried out, even granting that the learning can be completed, the image after a deformation must be compared with the reference data obtained as a result of the learning in terms of all degrees of freedom, therefore, the processing burden becomes excessive, and such a processing as recognizing a face from a moving image in real time has been virtually impossible.

The present invention has been made in view of the circumstances as described above, and it is one of objects of the invention to provide a recognition device which can learn and obtain data for normalization in a reasonable time even when the deformation degrees of freedom are great for a recognition target.

It is another object of the present invention to provide a recognition device which can in real time recognize a predefined part from data, such as a moving image, which changes with continuity in time series.

According to a first aspect of the invention, there is provided a data recognition device including: a recognizing unit that specifies, out of processing target data that changes in time series, predetermined recognition target data parts from the first to the n-th in order by searching a recognition target data part from the processing target data by use of a processing parameter; a storing unit that stores, as recognition related information, a processing parameter that is used when the i-th ($1 \leq i < n$) recognition target data part is specified; and a processing parameter setting unit that generates a processing parameter to be used in recognizing the i+1-th recognition target data part and outputs the generated processing parameter to the recognizing unit.

According to a second aspect of the invention, there is provided a data recognition device for intermittently specifying, out of processing target data that changes in time series, predetermined recognition target data parts, the data recognition device including: a specifying unit that specifies at least a part of the processing target data as a focusing part; a calculating unit that calculates, with a calculation rule defined by use of preset reference data, a degree of similarity between the focusing part and the reference data; a recognizing unit that determines, based on the degree of similarity, whether or not the focusing part is a recognition target data part; and a storing unit that stores, when the recognizing unit determines that the focusing part is the recognition target data part, at least one of information concerning the calculation rule and information to specify the focusing part, wherein at least one of the specifying unit and the calculating unit uses the information stored in the storing unit for processing the next processing target data.

According to a third aspect of the invention, there is provided a data recognition device for specifying, out of processing target data that changes in time series, predetermined recognition target data parts, the data recognition device including: a selecting unit that selects, out of the series of processing target data, one piece of processing target data; a specifying unit that specifies at least a part of the selected processing target data as a focusing part; a calculating unit that calculates, by a calculation rule defined by use of preset reference data, a degree of similarity between the focusing part and the reference data; a recognizing unit that determines, based on the degree of similarity, whether or not the focusing part is a recognition target data part; and a storing unit that stores at least one of information concerning the calculation rule and information to specify the focusing part, wherein at least one of the specifying unit and the calculating unit uses the information stored in the storing unit for processing the next processing target data.

According to a fourth aspect of the invention, there is provided a data recognition method including: specifying, out of processing target data that changes in time series, predetermined recognition target data parts from the first to the n-th in order by searching a recognition target data part from the processing target data by use of a processing parameter; storing, as recognition related information, a processing parameter that is used when the i-th ($1 \leq i < n$) recognition target data part is specified; and setting the processing parameter to be used in specifying the i+1-th recognition target data part in the specifying process.

According to a fifth aspect of the invention, there is provided a data recognition method for intermittently specifying, out of processing target data that changes in time series, predetermined recognition target data parts, the method including: specifying at least a part of the processing target data as a focusing part; calculating, with a calculation rule defined by use of preset reference data, a degree of similarity between the focusing part and the reference data; determining, based on the degree of similarity, whether or not the focusing part is a recognition target data part; and storing, when the focusing part is determined to be the recognition target data part, at least one of information concerning the calculation rule and information to specify the focusing part, wherein in at least one of the specifying process and the calculating process, the information stored in the storing unit is used for processing the next processing target data.

According to a sixth aspect of the invention, there is provided a data recognizing program product for causing a computer to execute procedures including: specifying, out of processing target data that changes in time series, predetermined recognition target data parts from the first to the n-th in order by searching a recognition target data part from the processing target data by use of a processing parameter; storing, as recognition related information, a processing parameter that is used when the i-th ($1 \leq i < n$) recognition target data part is specified; and setting the processing parameter to be used in specifying the i+1-th recognition target data part in the specifying process.

According to a seventh aspect of the invention, there is provided a data recognizing program product for causing a computer to execute procedures for intermittently specifying, out of processing target data that changes in time series, predetermined recognition target data parts, including: specifying at least a part of the processing target data as a focusing part; calculating, with a calculation rule defined by use of preset reference data, a degree of similarity between the focusing part and the reference data; determining, based on the degree of similarity, whether or not the focusing part is a recognition target data part; and storing, when the focusing part is determined to be the recognition target data part, at least one of information concerning the calculation rule and information to specify the focusing part, wherein in at least one of the specifying process and the calculating process, the information stored in the storing unit is used for processing the next processing target data.

BRIEF DESCRIPTION OF THE DRAWINGS

The above objects and advantages of the present invention will become more apparent by describing in detail of a preferred embodiment thereof with reference to the accompanying drawings, wherein.

DETAILED DESCRIPTION OF THE PREFERRED EMBODIMENT

Figure 1:
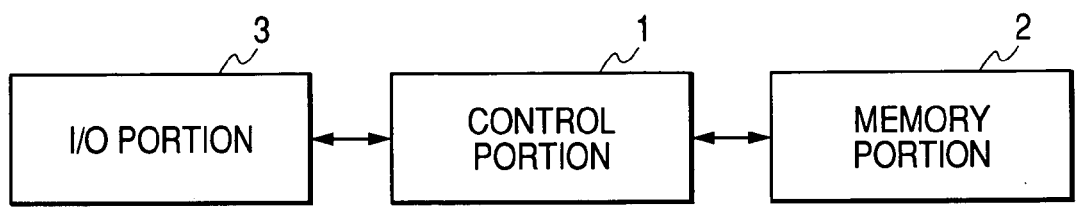
FIG. 1 is a block diagram showing a structural example of the data recognition device according to an embodiment of the present invention.

Hereinafter, a recognition device according to an embodiment of the present invention will be described in detail with reference to the drawings. A data recognition device according to the embodiment includes, as shown in FIG. 1, a control portion 1, a memory portion 2, and an input/output portion 3. The control portion 1 operates in accordance with a program stored in the memory portion 2 and carries out a processing to intermittently specify predetermined recognition target data parts from processing target data which changes in time series. Detailed contents of this processing will be described later.

The memory portion 2 is a computer-readable recording medium in which a program to be executed by the control portion has been stored. In addition, this memory portion 2 also operates as a work memory, which stores various types of information generated in the course of processing in the control portion 1.

The input/output portion 3 outputs data to be inputted from an external device (processing target data which changes in time series) into the control portion 1. In addition, this input/output portion 3 also outputs various types of information into an external device in accordance with an instruction inputted by the control portion 1.

Figure 2:
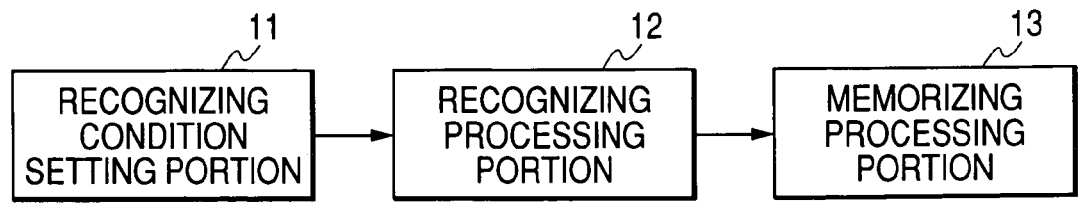
FIG. 2 is a functional block diagram showing a processing example of the data recognition device according to the embodiment.

Next, the contents of the processing to be carried out by the control portion 1 will be described. Here, a processing to specify a human face as a recognition target from moving image data will be described by way of an example. This processing functionally includes, as shown in FIG. 2, a recognizing condition setting portion 11, a recognizing processing portion 12, and a memorizing processing portion 13.

The recognizing condition setting portion 11 generates a processing parameter based on information (recognition-related information) concerning a preceding recognition stored in the memory portion 2 and outputs the generated processing parameter to the recognizing processing portion 12. The recognizing processing portion 12 specifies a facial part (recognition target part) of a recognition target from the image data of a processing target. The memorizing processing portion 13 stores, when the facial part is recognized in the recognizing processing portion 12, information corresponding to a processing parameter such as a position, size, and angle of the face in the memory portion 2 as recognition-related information.

A First Example of the Recognizing Processing Portion

Herein, a detailed example of the recognizing processing portion 12 will be described. This recognizing processing portion 12 is a general purpose type which can be utilized not only for a device of the embodiment but also for other processings, and in detail, it has a configuration as exemplified in the following.

Figure 3:
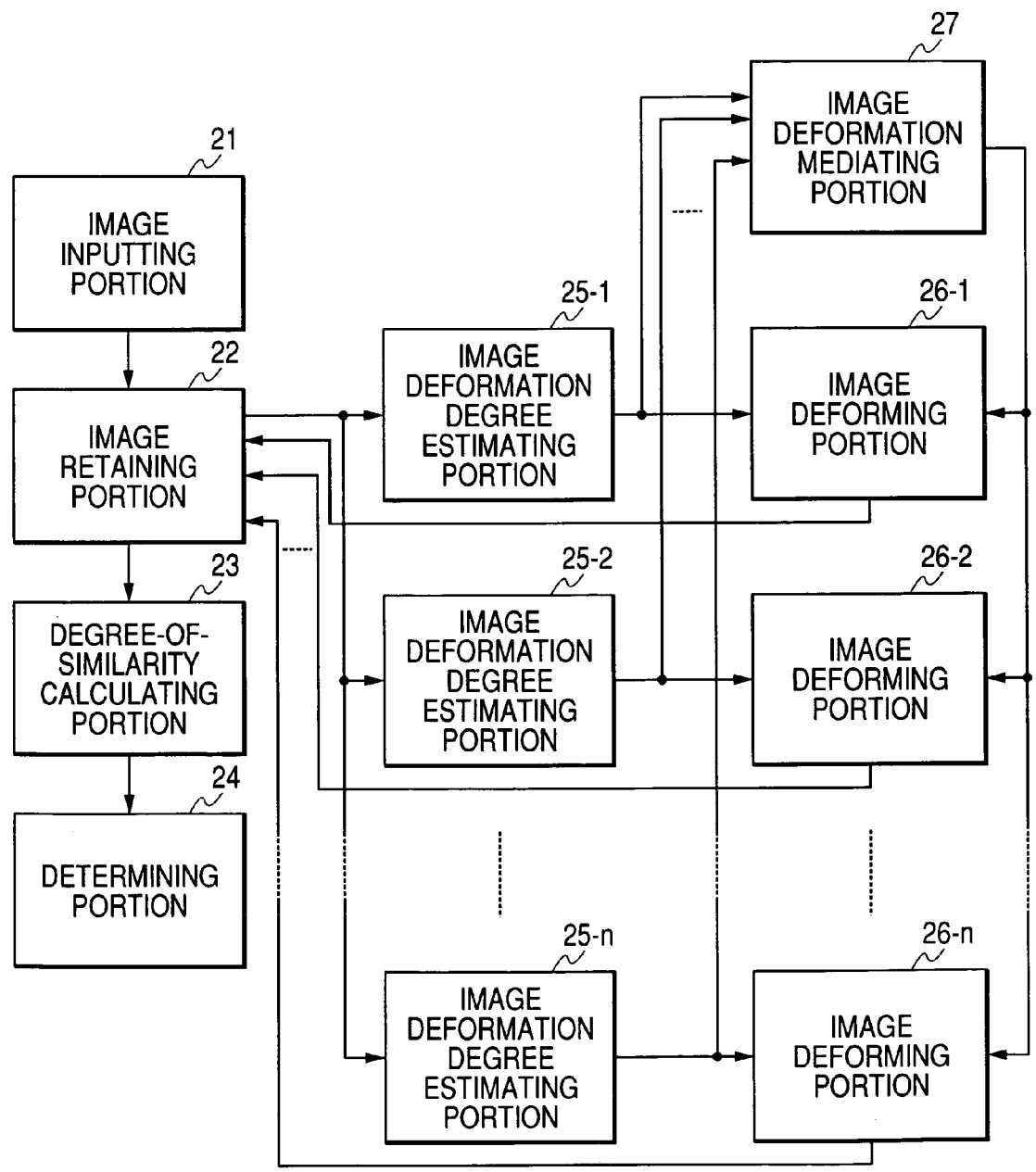
FIG. 3 is a block diagram showing a functional configuration of a recognizing processing portion.

FIG. 3 is a functional block diagram of the recognizing processing portion 12. As shown in the same drawing, the recognizing processing portion 12 comprises an image inputting portion 21, an image retaining portion 22, a degree-of-similarity calculating portion 23, a determining portion 24, a plurality of image deformation degree estimating portions 25 (25-1 to 25-n), a plurality of image deforming portions 26 (26-1 to 26-n), and an image deformation mediating portion 27. This recognizing processing portion 12 is a general purpose type, and setting, etc., for using the same in the device of the embodiment will be described later.

The image inputting portion 21 is for accepting image data to be a processing target, and for example, this outputs image data to be inputted from an external device such as a CCD camera via the input/output portion 13 into the image retaining portion 22. The image retaining portion 22 retains processing target image data inputted from the image input portion 21 by storing the same in the memory portion 2. This image data is, for example, retained as a vector pattern which employs luminances of respective pixels composing the image data and has dimensions of the number of pixels. The retained image data is appropriately deformed by the image deforming portions 26 and the deformed image data is again retained in the image retaining portion 22.

The degree-of-similarity calculating portion 23 calculates the degree of similarity of the image data retained in the image retaining portion 22 to a template image provided as reference data. The degree of similarity can be expressed by use of a Euclidean distance between image data retained in the image retaining portion 22 and template image, namely, a square root of a sum of squares of a difference in luminance between the corresponding pixels, and a distance between a subspace by approximating the distribution of a plurality of template images and image data retained in the image retaining portion 22. For example, if the reciprocal numbers of these distances are employed as the degree of similarity, the smaller these distances are, the greater the degree of similarity becomes. In addition, the degree-of-similarity calculating portion 23 can serve as an estimation error evaluating portion 34, which will be described later.

A determining portion 24 compares the degree of similarity calculated by the degree-of-similarity calculating portion 23 with a predetermined threshold value and, if the degree of similarity is greater than the threshold value, determines that the target is identical to the reference object.

The image deformation degree estimating portions 25 (25-1 to 25-n) are respectively provided in a manner corresponding to mutually different image deformation degrees of freedom, and each thereof estimates, in terms of its corresponding degree of freedom, how much the image retained in the image retaining portion 22 is deformed from the template image. Here, as the image deformation degrees of freedom, a positional shift, rotation, enlarging or contracting, etc., can be mentioned, for example. In addition, these image deformation degree estimating portions 25 also evaluate and output an accuracy of the estimated image deformation. Operation of these image deformation degree estimating portions 25 will be described later in detail.

Image deforming portions 26 (26-1 to 26-n) are respectively provided in a manner corresponding one on one to the image deformation degree estimating portions 25 (25-1 to 25-n) and carry out a processing of deforming an image retained in the image retaining portion 22 to approximate the same to a template image. The degrees of freedom for image deforming operation of these image deforming portions 26 are the same as the image deformation degrees of freedom of the respectively corresponding image deformation degree estimating portions 25, and the amount of deforming operation is determined according to an estimated value of image deformation from the corresponding image deformation degree estimating portion 25 and an accuracy thereof. The deforming operation amount is a value obtained by multiplying the estimated value of image deformation by a deceleration factor. The deceleration factor is "1" when the estimated value error is "0", and this approximates "0" as the estimated value error becomes great. The direction of image deforming operation is a direction where an image retained in the image retaining portion 22 approximates the template. Namely, the smaller the estimation error becomes, the smaller number of the image operation becomes to approximate an image retained in the image retaining 22 to the template image.

In detail, this image deforming portion 26 delimits, as a focusing part, an image part within a partial rectangle from image data of a processing target and deforms the delimited focusing part at the degree of freedom as described above. At this time, the image deforming portion 26 may deform an image corresponding to the focusing part delimited by a rectangle by, for example, deforming the rectangle to delimit the focusing part at the degree of freedom as described above. Namely, while employing image data of processing target as an original image, the manner of extraction therefrom may be changed at the degree of freedom as described above. In addition, an image processing corresponding to the degree of freedom as described above to an image extracted from an original image as a focusing point may be applied to deform the image corresponding to the focusing part. Furthermore, these may be combined to deform both of the rectangle for delimiting and image extracted thereby.

The image deformation mediating portion 27 mediates image operations by the respective image deforming portions 26. The mediation is carried out depending on an error of the image deformation degree estimated value outputted by each image deformation degree estimating portion 25, and only image deforming portions 26 corresponding to N (where N is an integer not less than "1") image deformation degree estimating portions 25 in ascending order of this value (namely, in ascending order of the estimated value error) are operated. In addition, out of the N image deformation degree estimating portions 25, for image deformation degree estimating portions 25 which output image deformation degree estimated values not more than a prescribed value, the image deformation mediating portion 27 may not operate the image deforming portions 26 corresponding thereto. Here, the integer N may be predetermined or may be set equal to the number of image deformation degree estimating portions 25 which output an estimated value error smaller than a predetermined threshold value.

Figure 4:
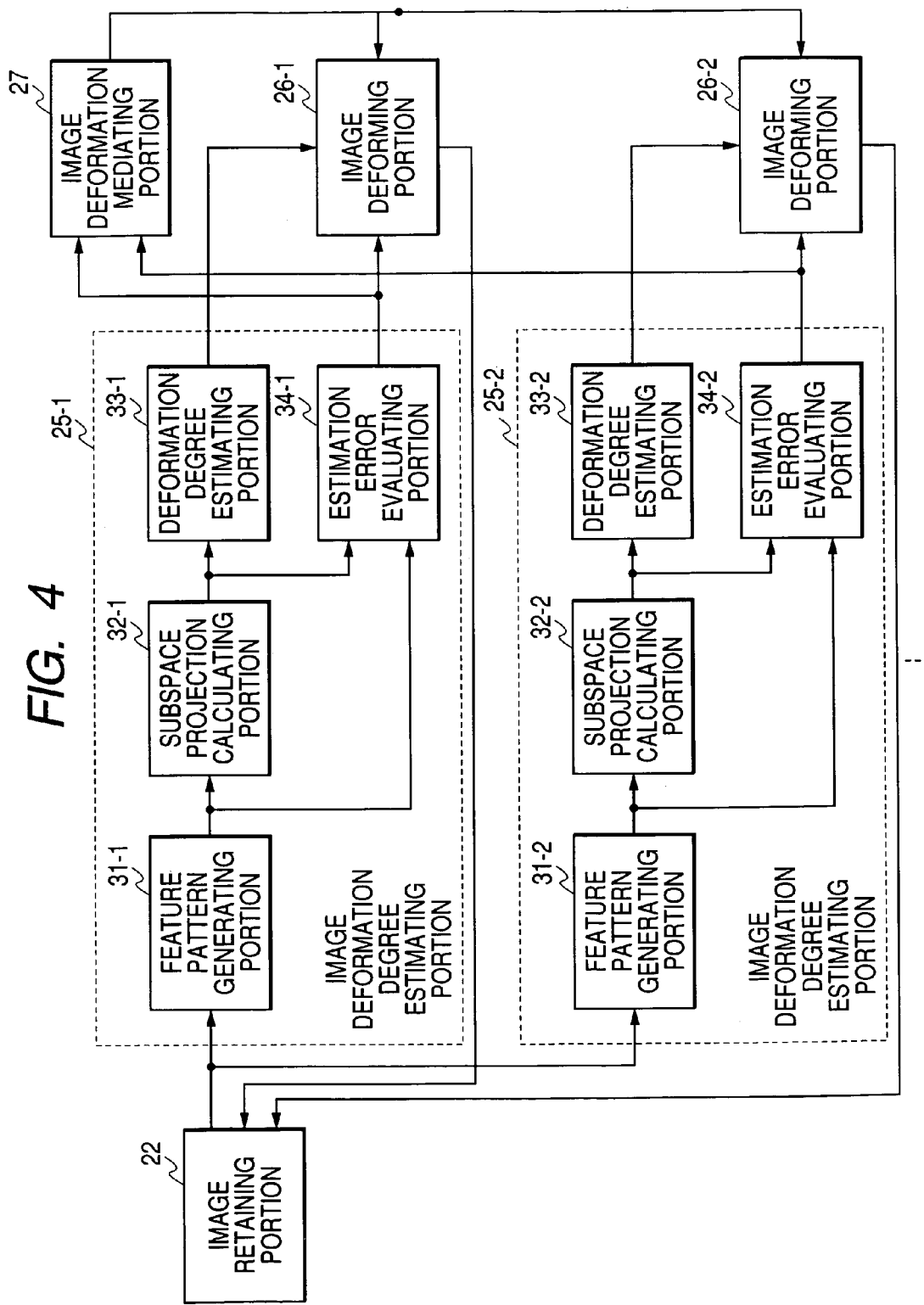
FIG. 4 is a diagram showing a structural example of an image deformation degree estimating portion.

Next, a configuration of the image deformation degree estimating portions 25 will be described in detail. FIG. 4 is a diagram showing a detailed configuration of the image deformation degree estimating portions 25. As shown in the same drawing, the image deformation degree estimating portions 25 each comprise a feature pattern generating portion 31, a subspace projection calculating portion 32, a deformation degree estimating portion 33, and an estimation error evaluating portion 34.

The feature pattern generating portion 31 reads out a vector pattern indicating image data from the image retaining portion 22 and therefrom generates a feature pattern by a predetermined conversion. Methods of this conversion include, for example, a method for applying a Fourier transformation or a wavelet transformation to the vector pattern and a method for projecting the vector pattern onto a limited number of base vectors. Here, the base vectors to be projecting targets can be determined as a set of vectors with great eigenvalues, which are obtained by a principal component analysis of a large number of arbitrary image data.

The subspace projection calculating portion 32 retains information to specify a subspace to approximate feature pattern distributions, which is previously obtained by learning, and when a feature pattern is inputted from the feature pattern generating portion 31, the subspace projection calculating portion 32 projects this feature pattern onto the subspace and outputs a coordinate value on the coordinate system of the projected subspace. Here, a projection vector of the feature pattern onto the subspace is defined as a point in a subspace which is closest in distance to the feature pattern. Since fluctuations of the feature pattern are very complicated in the real world, for approximating the fluctuations, it is preferable that the subspaces are nonlinear spaces.

Figure 5:
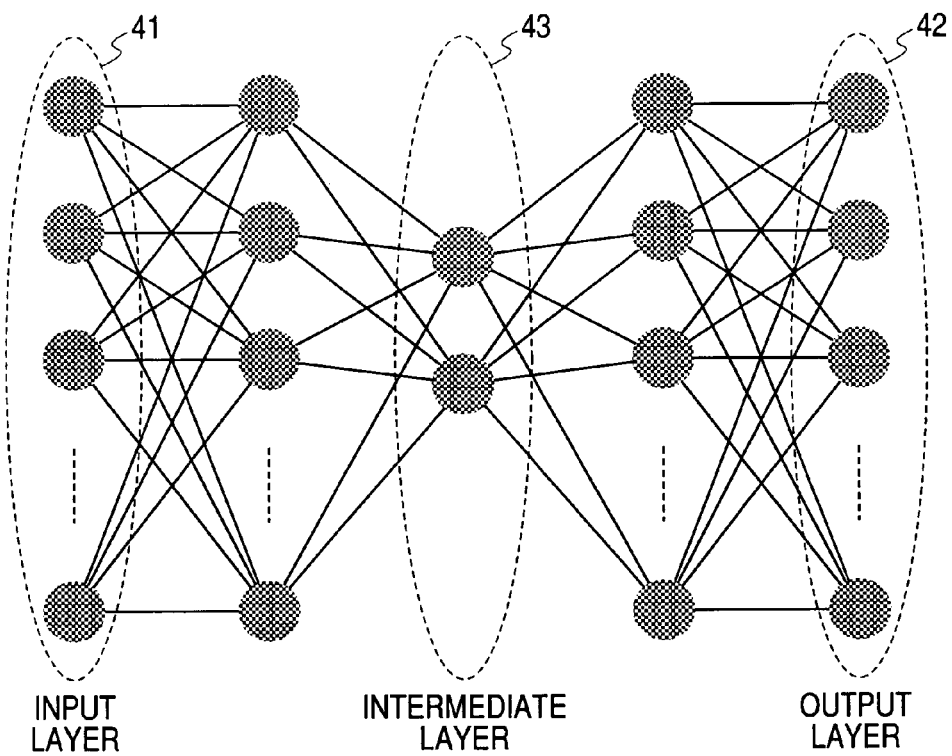
FIG. 5 is a diagram for explaining an outline of an auto-encoder.

Such nonlinear subspaces can, for example, be expressed by a neural network called an auto-encoder as shown in FIG. 5. The auto-encoder is a type of multi-layer perception, and as in FIG. 5, the number of neurons n of the input layer 41 and the number of neurons n of the output layer 42 is the same, and the number of neurons of the middle layer 43 is smaller than the number of neurons of the input layer 41. And, in response to the value inputted into the input layer 41, a value equal to the same is given as a teacher signal to the neurons of the output layer 42 and makes the same learn the weight of each synoptic connection so as to realize identity mapping. This learning is carried out by a normal back propagation method.

Figure 6:
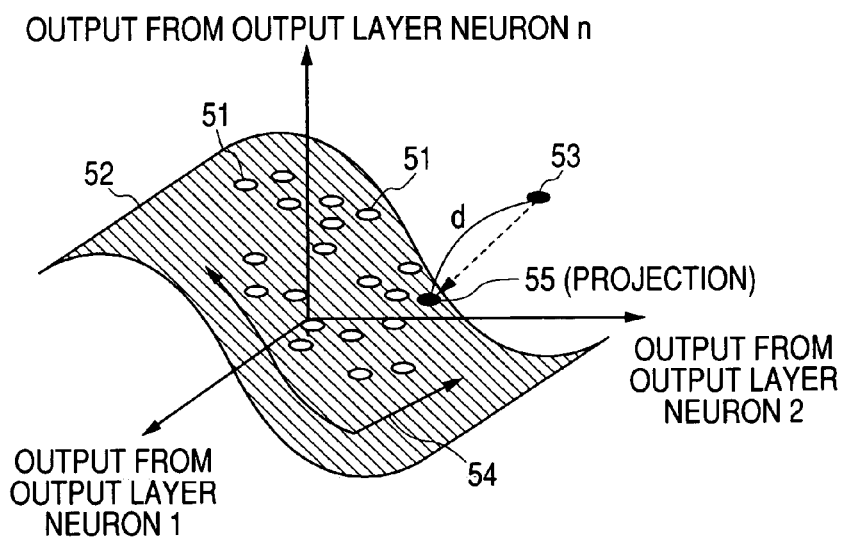
FIG. 6 is a diagram for explaining a nonlinear subspace.

The output of the auto-encoder output layer 42 learned as such composes, as shown in FIG. 6, a nonlinear subspace 52 approximating learning sample 51 distributions in an n-dimensional space indicating input, and the neuron output of the auto-encoder intermediate layer 43 corresponds to the coordinate component on the coordinate system 54 of the nonlinear subspace 52. Accordingly, the output of the output layer 42 when the feature pattern 53 is inputted into the auto-encoder after learning becomes a projection 55 of the feature pattern 53 to the nonlinear subspace 52, and the neuron output 54 of the intermediate layer 43 expresses the projection vector 55 on the coordinate system of the nonlinear subspace 52.

The deformation degree estimating portion 33 previously learns a relationship between the projection of the feature pattern outputted by this subspace projection calculating portion 32 onto the subspace and image deformation. By use of this result of learning, the deformation degree estimating portion 33 determines an image deformation from the projection value onto the subspace and outputs the same. The relationship between the projection onto the projection value onto the subspace and image deformation is, for example, where the subspace is shown by the auto-encoder whose number of neurons of the intermediate layer 43 is "2" and the degree of freedom is of rotation, as shown in FIG. 7.

Figure 7:
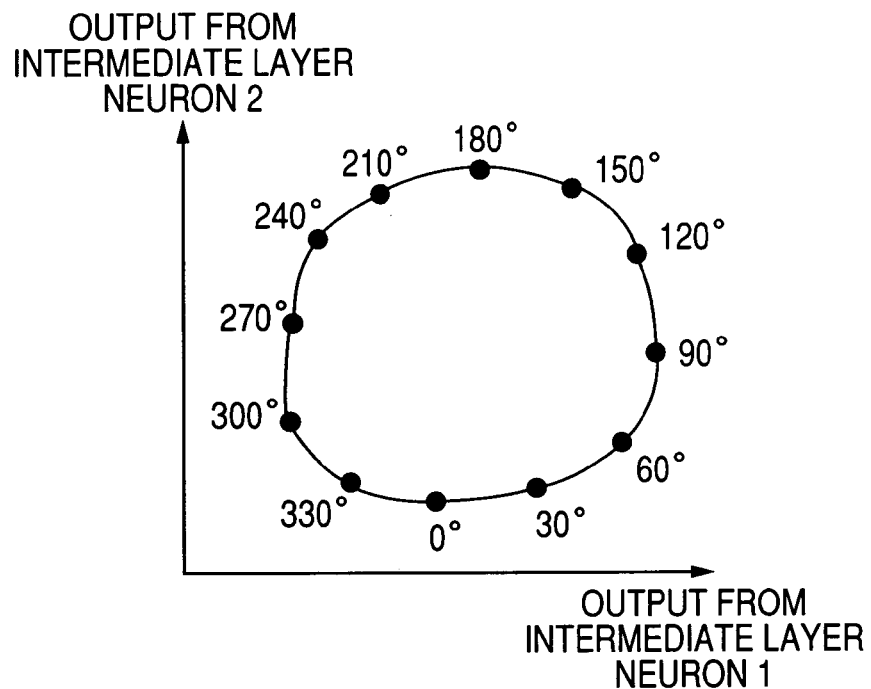
FIG. 7 is a diagram showing a relationship between the irradiating value onto the subspace and image rotating angle.

FIG. 7 shows two-dimensionally plotted two neuron outputs of the intermediate layer 43, and its locus forms a closed curve according to the image rotation angles. Since the points on this closed curve and image rotation angles correspond one to one, an image rotation angle can be estimated from the two neuron outputs of the intermediate layer 43. Such a relationship between the neuron output of the intermediate layer 43 and image deformation can be stored in the deformation degree estimating portion 33 as an approximate function or may be stored in a memory (unillustrated) as a lookup table. In this case, the deformation degree estimating portion 33 determines the image deformation based on the stored relationship.

The estimation error evaluating portion 34 calculates a distance d (see FIG. 6) between the feature pattern 53 and nonlinear subspace 52, and outputs this distance d as an accuracy of the image deformation degree estimated in the deformation degree estimating portion 33. Here, the distance between the feature pattern 53 and nonlinear subspace 52 is a Euclidean distance of the feature pattern 53 and the projection vector 55 onto nonlinear subspace 52, and for example, if the nonlinear subspace 52 is expressed by an auto-encoder, this can be expressed by a Euclidean distance between the input and output of the auto-encoder. Moreover, since the smaller the distance is between the feature vector 53 and nonlinear subspace 52, the more the feature vector 53 is considered to be approximated by the nonlinear subspace 52, it is appropriate to use d as an error of image deformation. As a matter of course, in place of the distance d, an arbitrary monotone increasing function concerning this distance d may be used.

Next, learning samples for making the recognizing processing portion 12 shown in FIG. 3 learn will be described. In the following, for simplification, an image to be a recognition target is considered to change its tilt and position in the observer's field of view but not to change a distance from the observer. Namely, the deformation degree of freedom of an image to be a recognition target is, for example, allowed for only a rotation in the image plane and for a shift in the image plane. Herein, this simplification is for the sake of explanation, and in actuality, other degrees of freedom can also be allowed.

In this example of recognizing processing portion 12, one image deformation degree estimating portion 25 is provided for each deformation degree of freedom. Accordingly, in response to the deformation degrees of freedom of the simplified image, two image deformation degree estimating portions 25 are prepared, and of these, the first image deformation degree estimating portion 25-1 takes charge of a rotation in the image plane, and the second image deformation degree estimating portion 25-2 takes charge of a shift in the image plane.

Figure 8A:
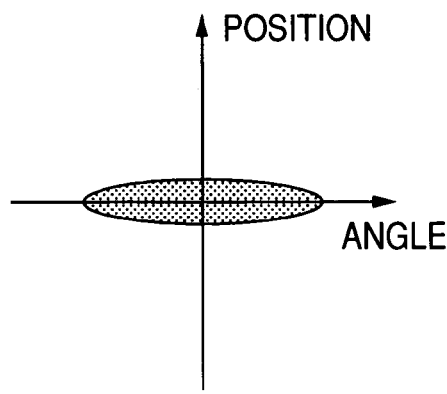
FIGS. 8A and 8B are diagrams showing a distribution of learning samples.

As the learning samples for the first image deformation degree estimating portion 25-1, a plurality of images of a target positioned in the center of the observer's field of view and in an upright condition are prepared, and these are respectively turned and shifted. The rotation angles may be changed, as in FIG. 8A, with uniform random numbers of, for example, −180 degrees to 180 degrees, and the shifting amounts may be changed, as in FIG. 8A, lengthwise and crosswise with random numbers of a 6-pixel-wide gaussian distribution. As the number of samples, 1000 images are prepared, for example.

Figure 8B:
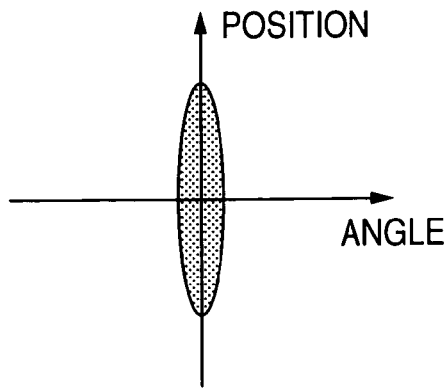

Similarly, as the learning samples for the second image deformation degree estimating portion 25-2, a plurality of images of a target positioned in the center of the observer's field of view and in an upright condition are prepared, and these are respectively turned and shifted. The rotation angles may be changed, as in FIG. 8B with random numbers of, for example, a 10-degree-wide gaussian distribution, and the shifting amounts may be changed, as in FIG. 8B, lengthwise and crosswise with uniform random numbers of −6 pixels to 6 pixels. As the number of samples, 1000 images are prepared, for example.

Figure 9:
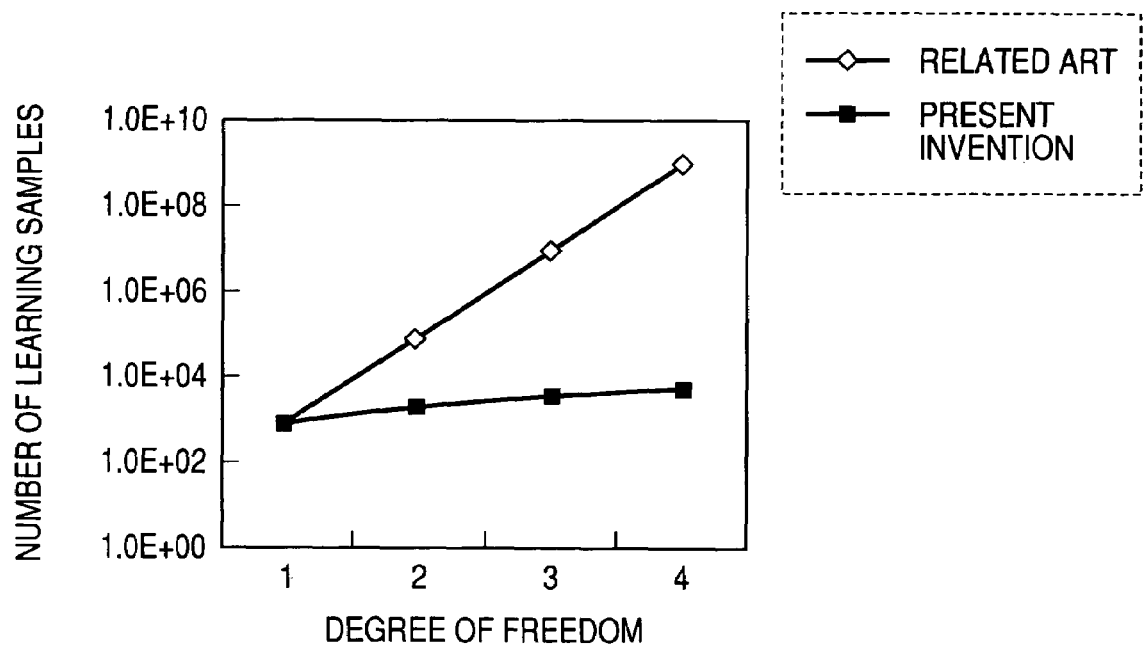
FIG. 9 is a diagram for comparing the number of learning samples of the first example with that of the related art.

As such, according to the recognizing processing portion 12 herein shown, it is sufficient to prepare almost the same number of learning samples for each degree of freedom of image deformation for which recognition is desired, and as shown in FIG. 9, the number of learning samples is in proportion to the degrees of freedom of image deformation. Here, as simultaneously shown in this FIG. 9, since, according to the prior art, it is necessary to prepare learning samples for all combinations of degrees of freedom for which recognition is desired, the number of samples is increased in progression compared to the degrees of freedom of image deformation. That is, according to this recognizing processing portion 12, particularly when the degrees of freedom of image deformation are increased, a small number of learning samples are required compared to the prior art, and the learning time also becomes short. In addition, the more learning samples there are, the more the resources (for example, in a case of the auto-encoder, the number of neurons and the number of synapses of the intermediate layer) to express a subspace for approximating learning sample distributions increases, and the calculating time is also increased, therefore, this recognizing processing portion 12 also has an effect of resource reduction and shortening of the recognizing time.

Learning Operations

Figure 10:
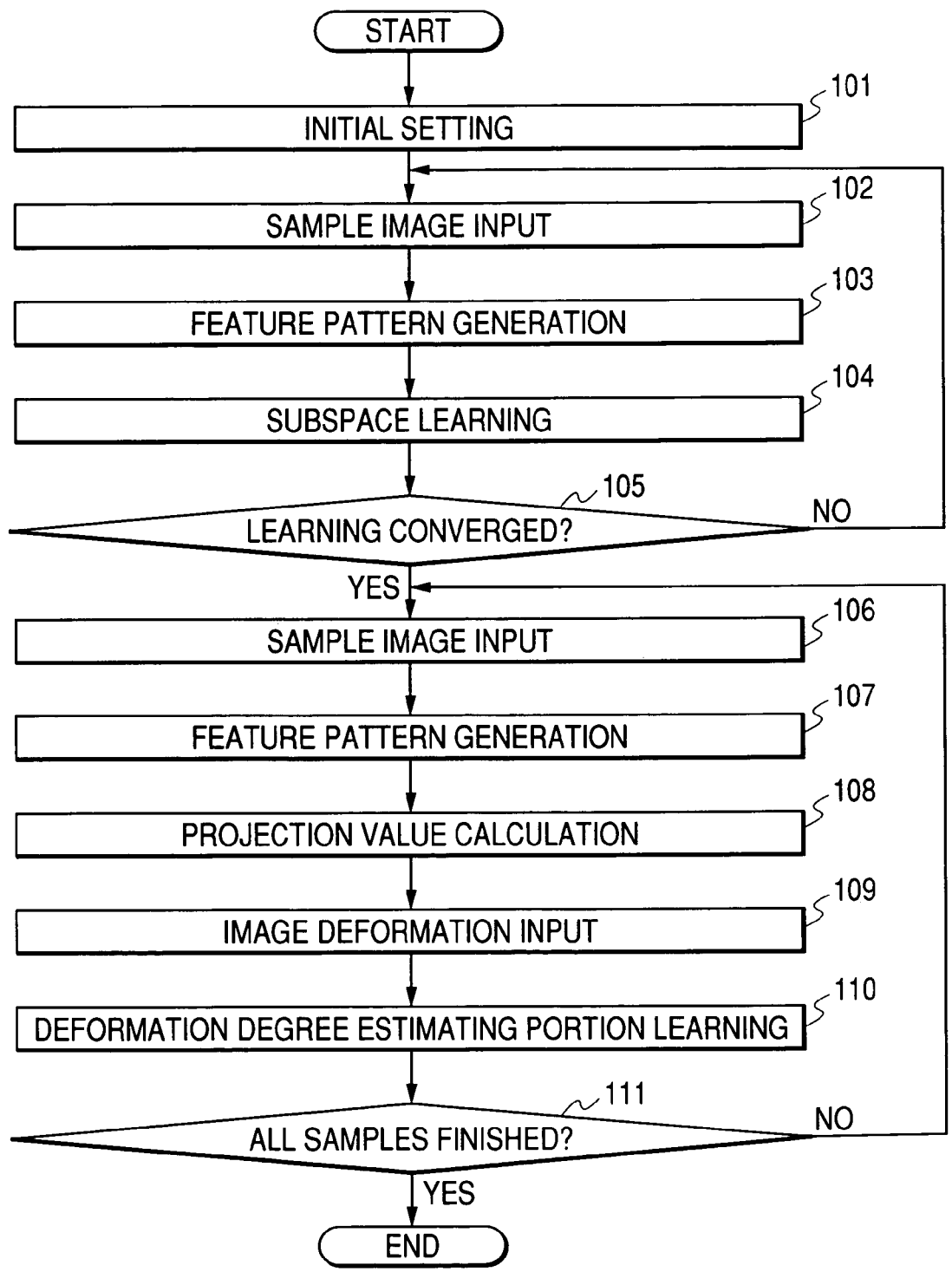
FIG. 10 is a flowchart showing an operation flow during learning of the recognizing processing portion.

Next, operations during learning of the recognizing processing portion 12 will be described. FIG. 10 is a flowchart showing an operation flow during learning of the recognizing processing portion 12.

The learning processing can be carried out for the first image deformation degree estimating portion 25-1 and the second image deformation degree estimating portion 25-2 independently, and the contents of learning processing are almost the same, therefore, learning of the first image deformation degree estimating portion 25-1 will be described.

First, the control portion 1 initializes the auto-encoder of the first image deformation degree estimating portion 25-1 (step 101). In the initial setting, the number of neurons of the input layer and output layer is set to the number of dimensions of the feature pattern, and the number of neurons of the third layer is set to "2" which is the degree of freedom of image rotation. The number of neurons of the second layer and fourth layer is set to the number of dimensions of the feature pattern or more. Furthermore, the weight of each synapse is initialized by a random number.

Next, for example, a 27×27-pixel learning sample (sample image data) is inputted in the image input portion 21, and this is, in a shape of 729-dimensional vectors having the luminance value of each pixel as a component, retained in the image retaining portion 22 (step 102). Subsequently, the sample image data retained in the image retaining portion 22 is read out by the control portion 1, a processing of a feature pattern generating portion 21-1 is carried out, and sample image data is projected onto a linear subspace with a predetermined number of dimensions, for example, a 50-dimensional linear subspace to convert the same to a 50-dimensional feature pattern (step 103). Here, it is sufficient that the predetermined linear subspace is a subspace using, as a base, high-order 50 eigenvectors obtained by a principal component analysis of a large number of arbitrary 27 27-pixel sample image data. This projection onto the subspace has an effect of compressing the amount of data while almost maintaining the vector size.

Next, the control portion 1 inputs the feature pattern into the auto-encoder and simultaneously gives the same as a teaching signal of the auto-encoder. And, by a widely known back propagation method, the weight of each synapse is renewed so as to reduce a square error between the auto-encoder output and teaching signal, whereby learning of the subspace is carried out (step 104). And, the square error between the auto-encoder output and teaching image is averaged across all learning samples, and if this value has become smaller than a prescribed value is determined (step 105), and if it has not become smaller (if NO), the operation returns to step 102 to continue processing. In addition, if the value has become smaller in step 105 (if YES), the operation proceeds to step 106. Thereby, the learning is continued until the averaged value of the square error between the auto-encoder output and teaching signal across all learning samples has become smaller than the prescribed value. When the learning of the subspace has converged and the square error has become smaller than the prescribed value, that is, YES is obtained in step 105, the operation proceeds to step 106 and carries out learning of the image deformation degree estimating portion 25-1.

In the learning of the image deformation degree estimating portion 25-1, the learning sample is inputted again (step 106), the learning sample is converted to a feature pattern (step 107), and the feature pattern is inputted into the auto-encoder to calculate a projection value (step 108). And, two neuron outputs of the intermediate layer of the auto-encoder are inputted into the image deformation degree estimating portion 25-1 and the angle of a rotation carried out when generating the learning sample is simultaneously inputted (step 109), and as a result of the learning of the image deformation degree estimating portion 25-1, a lookup table of rotation angles is prepared for the two neuron outputs of the intermediate layer (step 110). The above processing is carried out for all learning samples (NO in step 111), and when the processing is finished for all learning samples (YES in step 111), the learning is completed.

Herein, description has been given for a case where the image deformation degree estimating portions 25 are respectively independently made to learn, however, the respective image deformation degree estimating portion 25 can be correlated to each other for learning. As this learning method, for example, the learning sample is inputted into all image deformation degree estimating portions 25, and only the image deformation degree estimating portion 25 which has obtained the best result (minimum distance) is made to learn, and this operation is repeated.

Recognizing Operations

Figure 11:
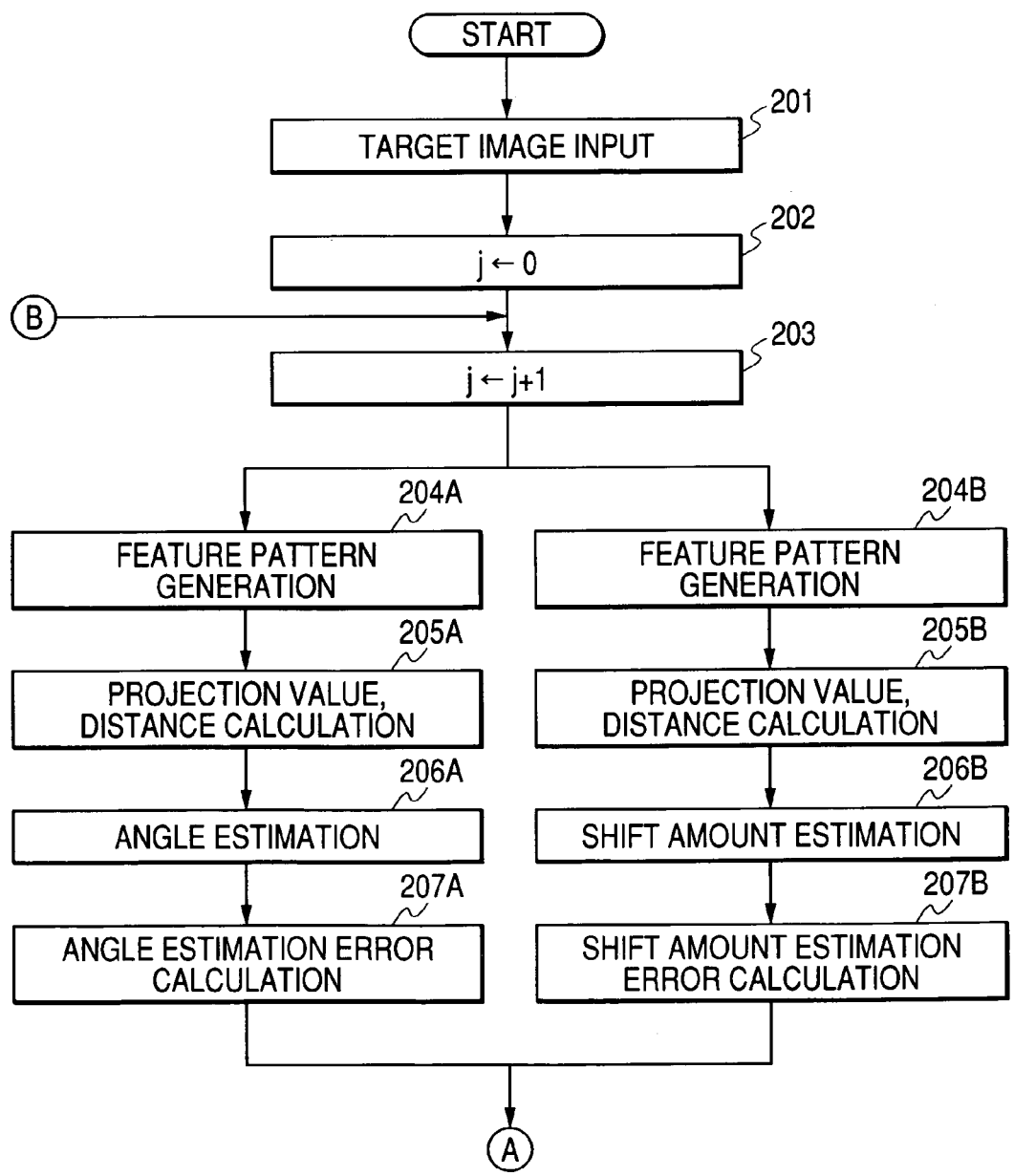
FIG. 11 is a first flowchart showing an operation flow during a recognition of the recognizing processing portion.
Figure 12:
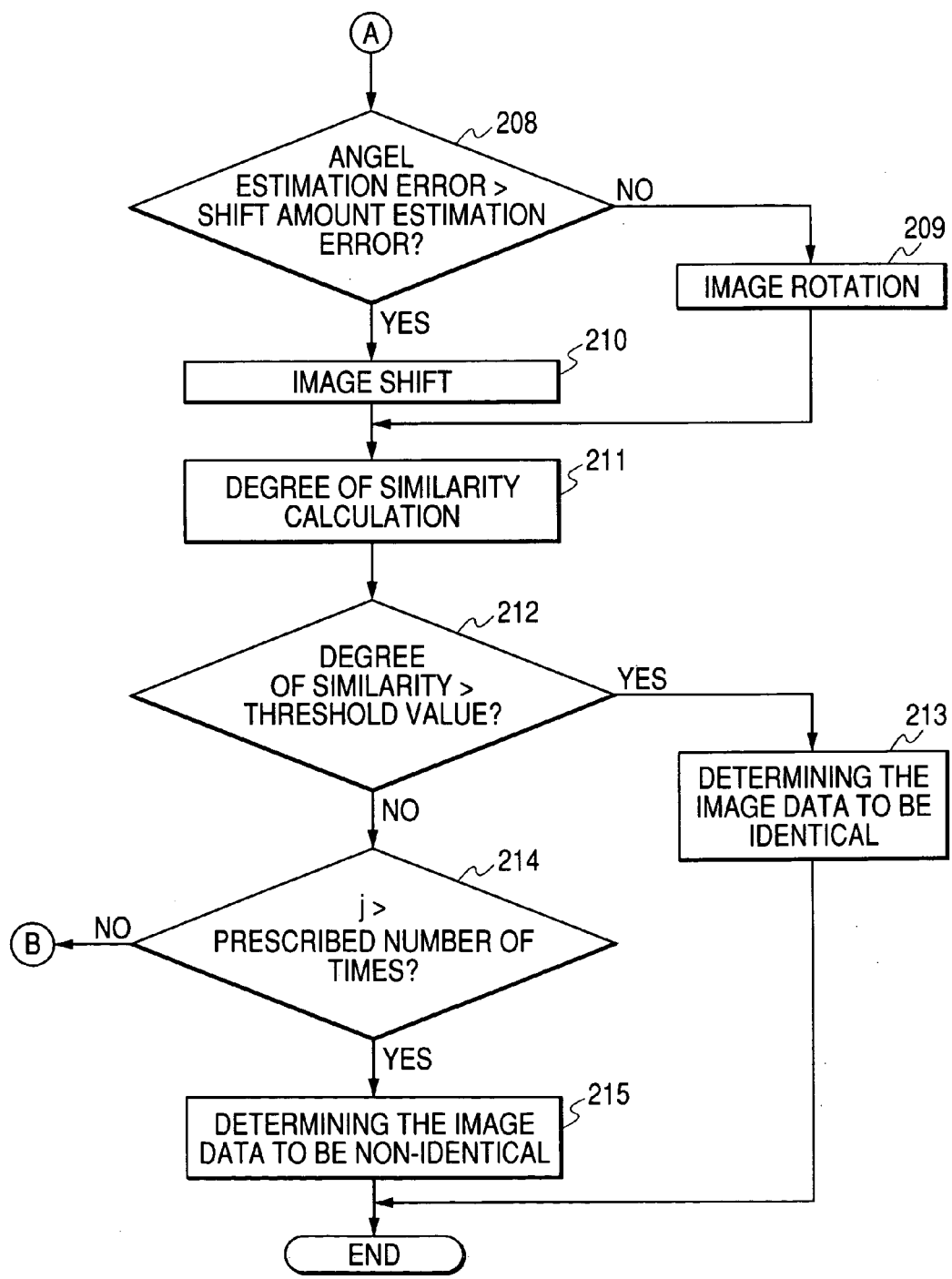
FIG. 12 is a second flowchart showing an operation flow during a recognition of the recognizing processing portion.

Next, operations during recognition of the recognizing processing portion 12 will be described. FIG. 11 and FIG. 12 are flowcharts showing an operation flow during recognition of the recognizing processing portion 12.

In the recognizing processing, first, image data (for example, m×n pixels) of a processing target is inputted in the image input portion 21, and the image retaining portion 22 makes the memory portion 2 retain this image data in a shape of m×n-dimensional vectors having the luminance value of each pixel as a component (step 201). In addition, the control portion 1 initializes the value of the counter j to count the number of image operations to "0", and information for delimiting a part of the image data to be a focusing region (for example, a 27×27-pixel rectangular region the same as the reference data) is initialized (initializing process; step 202), and then the value of the counter j is incremented (step 203).

The control portion 1, next, reads out the image data retained in the memory portion 2 by the image retaining portion 22 and projects, as a processing of the first feature pattern generating portion 31-1, the read-out image data onto a predetermined, for example, 50-dimensional linear subspace to obtain a 50-dimensional feature pattern (step 204A). And, based on this feature pattern, a processing of the first subspace projection calculating portion 32-1 is carried out to calculate a projection value onto the feature pattern and a distance between the feature pattern and subspace (step 205A), and an image rotation angle is estimated from the projection value onto the subspace of the feature pattern in the first deformation degree estimating portion (step 206A). In addition, in the first estimation error evaluating portion 34-1, an estimation error of the rotation angle is calculated from the feature pattern and subspace (step 207A).

On the other hand, apart from the processings of the steps 204A through 207A, the image data retained in the memory portion 2 is read out by the control portion 1 and projected, as a processing of the second feature pattern generating portion 31-2, onto a predetermined, for example, 50-dimensional linear subspace, and is converted to a 50-dimensional feature pattern (step 204B). And, based on this feature pattern, by a processing of the second subspace projection calculating portion 32-2, a calculation of a projection value onto the feature pattern and a distance between the feature pattern and subspace is carried out (step 205B), and in the second deformation degree estimating portion 33-2, an image shifting amount is estimated from the projection value onto the feature pattern subspace (step 206B) In addition, in the second estimation error evaluating portion 34-2, an estimation error of the rotation angle is calculated from the feature pattern and subspace (step 207B).

Here, the processings from step 204A to 207A and the processings from step 204A to 207B may be carried out in parallel or may be carried out in order.

Next, the image deformation mediating portion 27 compares, in the first estimation error evaluating portion 34-1, the estimation error of the rotation angle calculated in the first estimation error evaluating portion 34-1 with the estimation error of the shift amount calculated in the second estimation error evaluating portion 34-2. As a result of comparison, if the estimation error of the rotation angle is smaller (NO in step 208), by a processing of the image deformation mediating portion 27, image data stored in the memory portion 2 is rotated, by the first image deforming portion 26-1, in a direction to erect the image (step 209). On the other hand, if the estimation error of the shift amount is smaller (YES in step 208), by a processing of the image deformation mediating portion 27, image data stored in the memory portion 2 is shifted, by the second image deforming portion 26-2, in a direction to position the image in the center (step 210). Namely, by rotating or shifting coordinate information to delimit, as a focusing region, a part from the image data of the processing target, a deformation is carried out for the image data in the focusing region. Here, at this time, if the estimated value of the rotation angle or the shift amount is not more than a prescribed value (if close to a normalized image), without carrying out a deformation with regard to that degree of freedom, a deformation of the other may be prioritized.

Next, the degree-of-similarity calculating portion 23 calculates the degree of similarity between the image data stored in the memory portion 2 and an image of reference data (step 211). And, if this degree of similarity exceeds a preset threshold value (YES in step 212), it is determined that the image data of the processing target corresponds to the reference data (step 213), and the recognition processing is finished.

On the other hand, if the degree of similarity is not more than the threshold value (NO in step 212), if the number of image operation times is not more than the prescribed number of times, that is, the counter value j is not more than the prescribed number of times (NO in step 214), the operation proceeds to step 203 to again carry out a similar processing for the image data (data after a rotation or a shift) of the memory portion 2. If the number of image operation times exceeds the prescribed number of times (YES in step 214), it is determined that the image data of the processing target is different from the reference data (step 215), and the recognition processing is finished.

Figure 13:
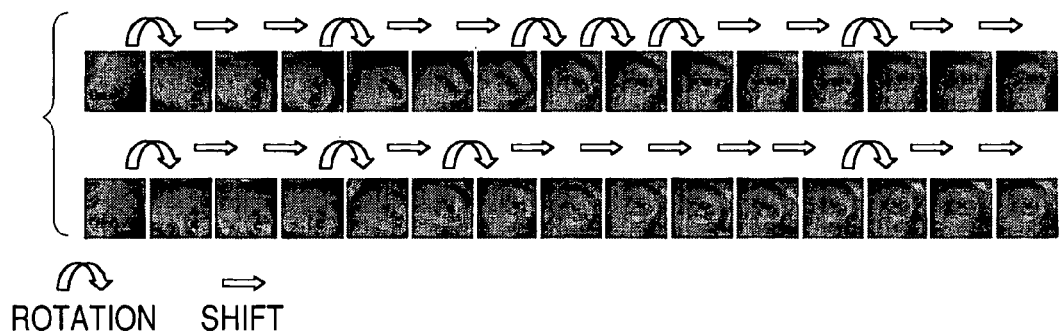
FIG. 13 is a view showing deforming conditions of an image retained in the memory portion.
Figure 14:
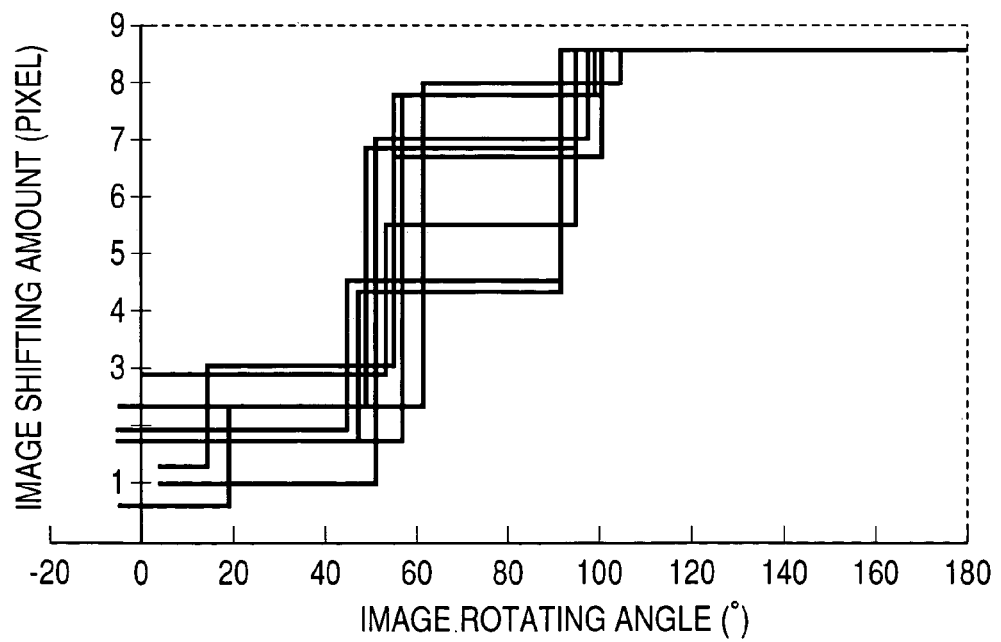
FIG. 14 is a diagram graphing transitions between the image angle and shifting from the center when a recognizing processing is carried out for 8 samples.

FIG. 13 shows deforming conditions of an image retained in the memory portion 2 when the processing described with reference to FIG. 11 and FIG. 12 is carried out for two types of human "eye" images with an angle of −180 degrees and a shift by 6 bits lengthwise and crosswise, respectively. In addition, FIG. 14 is a graph of transitions between the image angle and shifting from the center when a recognizing processing is carried out for 8 samples. From all drawings, it can be understood that an image rotation and shifting is repeated for an input, and an image erected and positioned in the center is obtained by several times of operations.

In the above, a case with two image deforming portions 26 has been described, however, with three or more image deforming portions, a recognition processing may be carried out by similar procedures. As the degree of freedom of deformation of a target in the image data, in addition to the deformations owing to a rotation in the depth direction and a lighting change, arbitrary deformations to express facial expressions and individual variations are possible.

In addition, a change of the condition of the object from a normalized condition can be expressed by use of an accumulated value of the deformation degrees, whereby a recognition of a condition of the target is also possible.

By the example described in the above, an image recognizing device which can recognize an object even when the environment of the object greatly changes can be realized by realistic resources, and learning can be easily carried out by a small number of learning samples.

Recognition Processing in the Embodiment

When the recognizing processing portion 12 according to the first example herein described is utilized, the control portion 1 carries out, as a processing of the memorizing processing portion 13, the following process. Namely, when it is determined that the image data of the processing target corresponds to the reference data (step 213), the memorizing processing portion 13 stores, as information indicating the contents of deforming operations applied to the image data of the processing target, an accumulated value (since there are only the rotation and shift in this example, coordinate information to specify a rectangular form delimited in the original image as a focusing region is provided) of the rotation angles and shift amounts as recognition-related information in the memory portion 2.

Here, when information other than the information to delimit a focusing region is employed as recognition-related information, the following is done. Namely, as already described, the image deformation mediating portion 27 selectively applies one of the image deformations done corresponding to each degree of freedom for rotation and shift. Therefore, it is sufficient that the image deformation mediating portion 27 prepares an accumulated value of deformation amounts (herein, rotation angles or shift amounts) corresponding to the herein selectively applied rotation or shift (any of mutually different deforming processes according to at least one degree of freedom) and employs this value as recognition-related information.

In the embodiment, the control portion 1 repeatedly carries out the processing of the recognizing processing portion 12 to each still image (frame) of a moving image of a processing target in time-series order (in order of time or in reverse). At this time, the contents of a deforming operation carried out for a focusing portion of each frame are by the memorizing processing portion 13, as recognition-related information, stored in the memory portion 2.

And, the recognizing condition setting portion 11 generates a processing parameter based on the recognition-related information stored in the memory portion 2 related to the frames processed until that time and outputs the same to the recognizing processing portion 12. Herein, the recognition-related information 11 outputs the information of the immediately preceding frame to the recognizing processing portion 12 as it is. At this time, the recognizing processing portion 12 sets, to image data retained by step 201, when initializing the information to define a focusing region in the initialization of step 202, the information inputted from the recognizing condition setting portion 11 as an initial value of information to delimit a focusing region in the current frame as it is.

As such, in the embodiment, the initial value of a processing parameter is provided for processing of the next frame. For example, when a face is recognized in frame, in its next frame, recognition is started by utilizing the recognized condition (facial position (corresponding to a shift) and facial tilt in a plane (corresponding to a rotation).

Here, by carrying out an insertion processing (n-order approximation) based on not only the recognition-related information (0-order approximation) of the immediately preceding frame but also the recognition-related information of a plurality of frames preceding the frame which is currently about to be processed, the recognizing condition setting portion 11 may determine a processing parameter related to the next frame.

In addition, since herein, as recognition-related information, information to delimit a focusing region is used out of image data of a processing target, initialization of the focusing region of the next frame is carried out based on the information, however, for example, if an accumulated value of image processing parameters for at least a part of the image data is the recognition-related information, initialization may be carried out by carrying out an image processing equivalent to the accumulated value of parameters for the part of the next frame.

A Second Example of the Recognizing Processing Portion

The processings of projection onto a subspace, deformation degree estimation, and estimation error evaluation are not limited to those described hereinbefore. Therefore, in the following, modifications of these processings will be described. Namely, another detail of the recognizing device is the same as that according to the first example shown in FIG. 3 and the processing carried out by the control portion 1 is approximately the same as that shown in FIG. 4, but is different in the processings, etc., in the subspace projection calculating portion 32, deformation degree estimating portion 33, and estimation error evaluating portion 34. Herein, description will be given mainly of these processings in the subspace projection calculating portion 32, deformation degree estimating portion 33, and estimation error evaluating portion 34, and detailed description of other parts will be omitted.

The subspace projection calculating portion 32 has already learned and acquired information to specify a subspace to approximate feature pattern distributions of reference data. Since feature vector fluctuations in the real world are very complicated. In order to approximate its fluctuations, the subspace is preferably a nonlinear space. However, herein, instead of learning a nonlinear subspace of a space where feature patterns are expressed, the feature patterns are mapped, by predetermined nonlinear mapping, into a space of a higher dimension than the feature pattern space, and a nonlinear subspace of the feature pattern space is approximately expressed by a subspace (linear space) of the mapped high-dimensional space.

In this case, in terms of the feature pattern of an inputted target image, the subspace projection calculating portion 32 maps, by nonlinear mapping, the feature patterns into a high-dimensional space, projects the same onto the linear subspace of the high-dimensional space, and outputs, in terms of the projection, a coordinate value on the coordinate system of the linear subspace. Herein, a projection vector is defined as a point on the linear subspace where the feature pattern is closest in distance to a nonlinear mapping image. In addition, the subspace projection calculating portion 32 calculates a distance between the nonlinear mapping image of the feature pattern and linear subspace and outputs it.

Next, a method for determining the projection value and distance from the subspace will be described in detail. When the feature pattern is provided as a d-dimensional vector x and a nonlinear mapping image for mapping this vector x onto a dΦ-dimensional, high-dimensional space F is provided as Φ, the following expression (1) is obtained.

$$\Phi: R^d \rightarrow F, x \rightarrow \Phi(x) = (\phi_1(x), \ldots, \phi_1(x))^T \quad (1)$$

An m-dimensional linear subspace of the high-dimensional space has already been determined by learning, and when its base vectors are provided as $\Phi 1, \ldots, \Phi m$, a projection values $\alpha 1, \ldots, \alpha m$ are, as shown in expression (2), determined as $\alpha 1, \ldots, \alpha m$ to minimize a distance L between the nonlinear mapping image of the feature pattern and point on the linear subspace. In addition, a root of the value of L at that time becomes a distance between the nonlinear mapping image of the feature pattern and linear subspace.

$$L = \left(\Phi(x) - \sum_{i=1}^{m} \alpha_i \Phi_i\right) \cdot \left(\Phi(x) - \sum_{i=1}^{m} \alpha_i \Phi_i\right) \quad (2)$$

However, in general, for expressing a strong nonlinearity of a feature pattern space, the number of dimensions of the high-dimensional space becomes very high, and it is difficult to complete the calculation of expression (2) in real time. Therefore, in the present second example of the recognizing processing portion 12, a mapping image is selectively employed as a nonlinear mapping image Φ for which a so-called kernel method can be used. Thereby, it becomes possible to calculate expression (2) in real time. Concretely, a nonlinear mapping image Φ is selected so, as to relate to a predetermined kernel function. Herein, the kernel function is a function defined by the feature pattern space expressed by the following expression (3). Herein, φ1 (x), . . . , φdΦ1 (x) are called eigen functions of the kernel function, and λ1, . . . , λdΦ are called eigen values thereof.

$$K(x, y) = \sum_{i=1}^{d_\Phi} \lambda_i \phi_i(x) \cdot \phi_i(y) \quad (3)$$

Here, as the kernel function, a gaussian kernel shown in expression (4) and a polynomial kernel shown in expression (5) can be mentioned.

$$K(x, y) = \exp\left(\frac{-\|x - y\|^2}{2\sigma^2}\right) \quad (4)$$

$$K(x, y) = (1 + x \cdot y)^d \quad (5)$$

The nonlinear mapping image Φ thus selected is, by use of eigen functions and eigenvalues, expressed by the following expression (6), for example. Furthermore, a linear subspace is restricted so that m eigenvectors of the linear subspace of a high-dimensional space become vectors of nonlinear mappings Φ (x1), . . . , Φ (xn) of arbitrary m vectors x1, . . . , xm (hereinafter, referred to as "pre-images").

$$x = (\chi, \ldots, \chi_d) | \rightarrow \Phi(x) = (\sqrt{\lambda_1} \phi_1(x), \ldots, \sqrt{\lambda_{d_\Phi}} \phi_{d_\Phi}(x)) \quad (6)$$

By use of the relationship of expression (3) expression (2) can be expressed as in expression (7). Since expression (7) does not explicitly include a vector operation of a high-dimensional space, calculation is easy. α1, . . . , αm are determined as α1, . . . , αm to make a differential of L0, and become as shown in expression (8). Herein, matrix K is a matrix having K(xi,xj) as a component of i lines and j columns. In addition, the minimum value of L can be obtained by substituting these α1, . . . , αm for expression (7).

$$L = K(x, x) - 2 \sum_{i=1}^{m} \alpha_i K(x, x_i) + \sum_{i=1}^{m} \sum_{j=1}^{m} \alpha_i \alpha_j K(x_i, x_j) \quad (7)$$

$$\alpha_i = \sum_{j=1}^{m} K_{ij}^{-1} k(x, x_j) \quad (8)$$

Next, the learning rule of a base vector of a linear subspace will be described. Since it is assumed that the base vector of a linear subspace inevitably has a pre-image, a pre-image, not of the base vector itself is learned. As the learning rule of a pre-image, after determining the projection values α1, . . . , αm, the pre-image xi is moved in a direction Δxi to reduce expression (7) at the maximum. Δxi is obtained by a so-called steepest descent method, and becomes as shown in expression (9).

$$\Delta x_i = -\eta \alpha_i (G(x))^{-1} \cdot \left(\frac{\partial}{\partial x_i} K(x, x_i) - \sum_{j=1}^{m} \alpha_j \frac{\partial}{\partial x_i} K(x_i, x_j)\right) \quad (9)$$

Herein, η is a learning coefficient and a positive constant.

G(x) is a metric tensor of a manifold embedded into a high-dimensional space by nonlinear mapping, and the metric tensor in expression (9) has a meaning of correcting a steepest ascent direction of a high-dimensional space to a steepest ascent direction of a feature pattern space.

G(x) can be expressed by use of a kernel function as in expression (10). Since expression (10) is basically a matter of linear optimization in a high-dimensional space, unlike nonlinear optimization, convergence is excellent, and learning can be carried out in a short time.

$$g_{ab}(x) = \left(\frac{\partial}{\partial x^a}\right) \cdot \left(\frac{\partial}{\partial x'^b}\right) K(x, x')\bigg|_{x=x'} \quad (10)$$

Figure 15A:
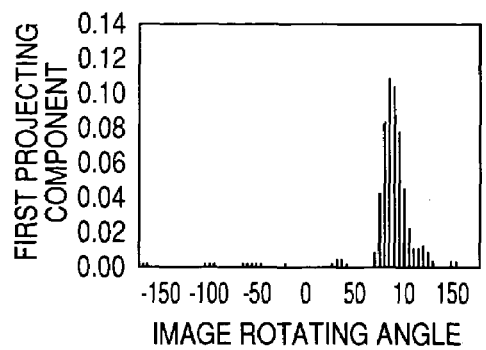
FIGS. 15A and 15B show 0 relationships between the specific projection value and image rotation angle according to the second example of recognition processing.
Figure 15B:
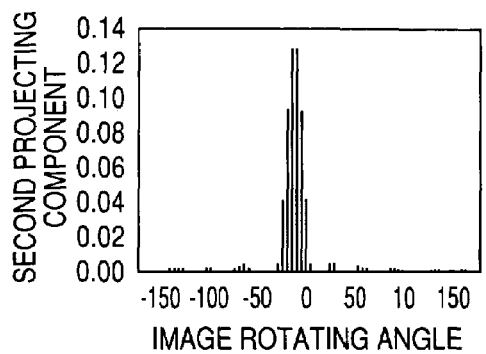

Next, the deformation degree estimating portion 33 will be described. The deformation degree estimating portion 33 has already learned a relationship between the projection onto a subspace of a feature vector outputted from the subspace projection calculating portion 32 and image deformation degree, determines, by use thereof, an image deformation degree from a projection value onto a subspace, and outputs the same. The relationship between the projection onto a subspace and image deformation degree is, for example, if the degree of freedom is a rotation, a relationship as shown in FIGS. 15A and 15B. In FIGS. 15A and 15B, arbitrary projection components are plotted for object angles, wherein each component reacts strongest on a specific angle, and the reaction weakens as the angle changes. A set of image deformation degree θ(i) where the number i of a base and a projection component onto the base maximizes is stored, as a look-up table, in the deformation degree estimating portion 33. And, the image deformation degree is determined as in expression (11) by, for example, weighted-averaging the value of θ(i) by use of an input α1, . . . , αm from the subspace projection calculating portion 32.

$$\vartheta = \frac{\sum_{i=1}^{m} \alpha_i \theta(i)}{\sum_{i=1}^{m} \alpha_i} \quad (11)$$

The estimation error evaluating portion 34 calculates L, which is a square of a distance between the nonlinear map of a feature pattern and linear subspace, by expression (7) and outputs the same as an accuracy of the image deformation degree estimated in the deformation degree estimating portion 33. Since the smaller L is, the better the feature pattern is considered to be approximated, it is appropriate to use L as an error of image deformation. As a matter of course, in place of the distance, an arbitrary monotone increasing function concerning L may be used.

Here, in this second example, samples required for learning, learning procedures and recognizing procedures of the recognizing processing portion 12, and utilizing samples in the embodiment are the same of those according to the first example, description thereof will be omitted.

A Third Example of Recognizing Processing Portion

Furthermore, the recognizing processing portion 12 can also be realized, for not only image data but also voice data, as a device for recognizing a specific voice such as, for example, a voice corresponding to "a." Therefore, next, a third example of the recognizing processing portion 12 will be described for, as an example, a case where a recognition of voice data is carried out. The recognizing processing portion 12 of this example has a configuration where the "image" of the configuration of the recognizing processing portion 12 of the first example shown in FIG. 3 has been replaced by a "voice."

Figure 16:
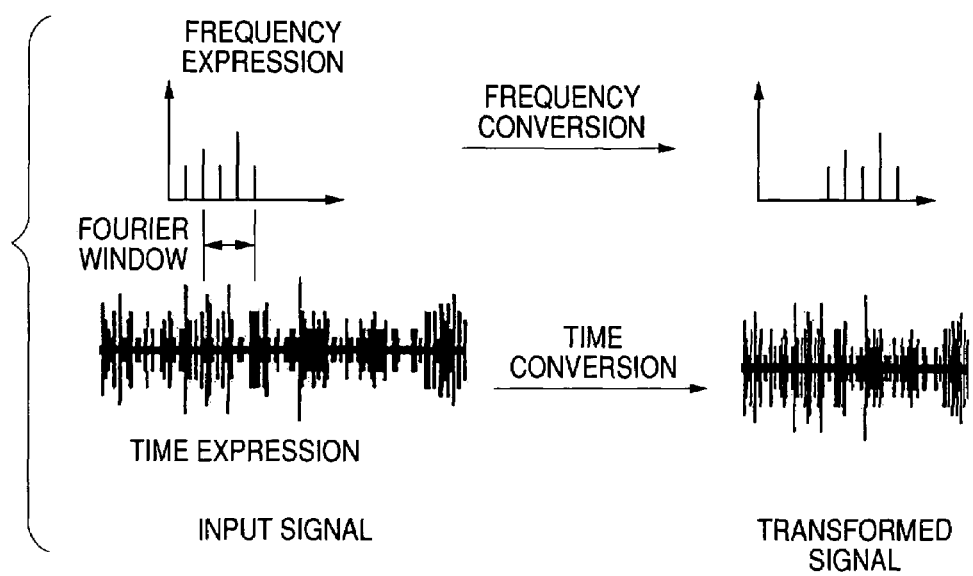
FIG. 16 shows a method for deforming inputted voice according to a third example of recognition processing.
Figure 17:
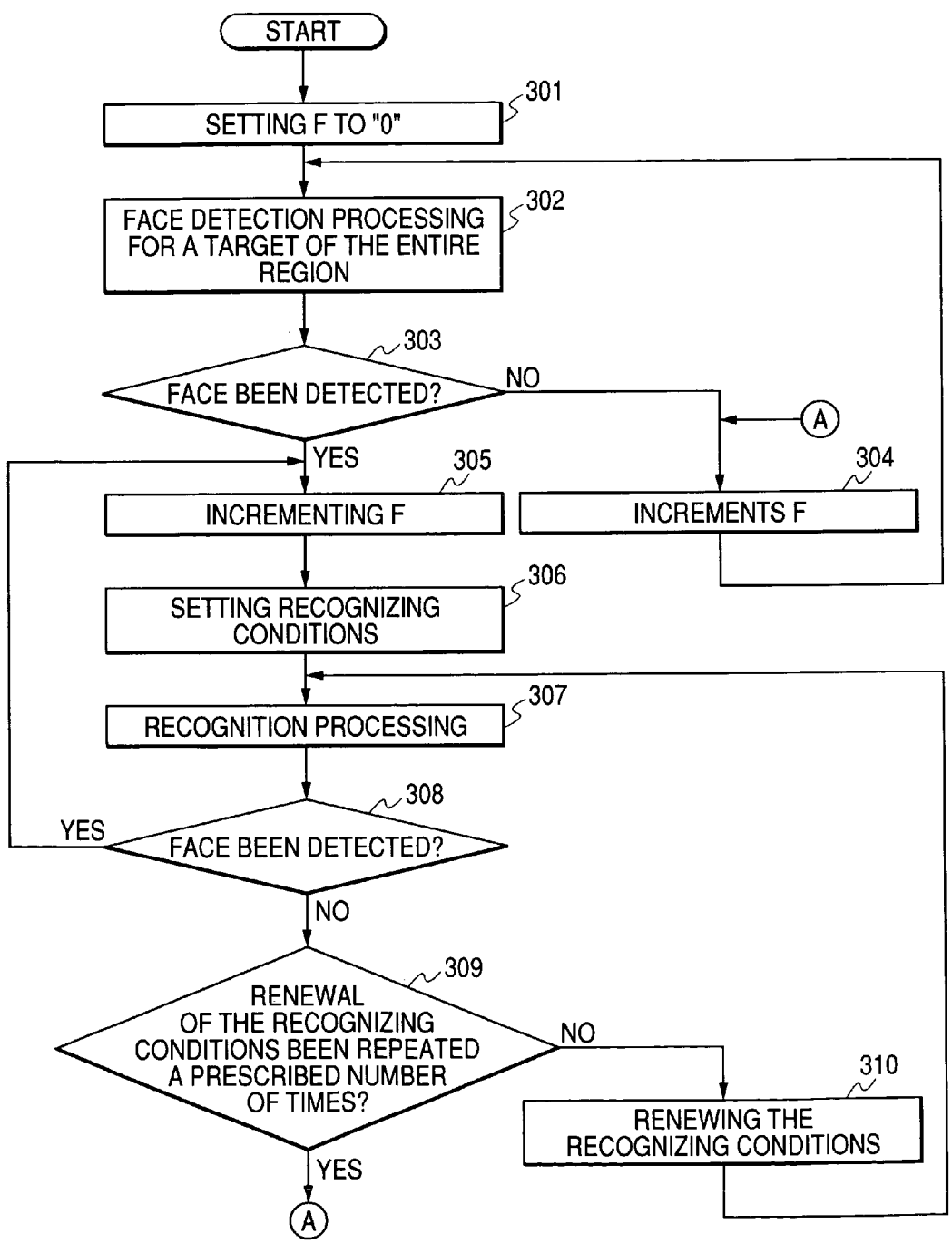
FIG. 17 is a flowchart showing an operation example of the data recognition device according to an embodiment of the present invention.

Accordingly, since a difference from the first example is, in actuality, in only an input pattern expressing method and an input pattern deforming method, this will be described by use of FIG. 16. An inputted voice is sampled at certain time intervals and is retained as an expression digitized in terms of time and two frequency expressions Fourier-transformed by a time region designated by a Fourier window. For the retained input, herein, two pattern deforming portions and pattern deformation degree estimating portion corresponding thereto are provided.

The first pattern deforming portion deforms a frequency expression to shift the frequency. On the other hand, the second pattern deforming portion deforms a time expression to expand the pattern in the time-base direction. By providing the two pattern deforming portions as in the above, a fluctuation of voice tone when being produced and a fluctuation of producing speed can be dealt with. Here, since the learning and recognizing procedures are the same as those of the first example, detailed description will be herein omitted.

In the above respective examples, recognition for images and voice has been described, however, data to be a recognition target is not limited hereto, and the present invention can be applied to any information which can be expressed as a feature pattern, such as sense of taste, sense of smell, and sense of touch. In addition, to images as well, the present invention can be applied to a case for determining color, and to voice as well, the present invention can be applied to a case where a word is a target or a sound produced by a musical instrument or the like is a target.

Unlike the moving image data, such data as voice is not previously sectioned into frames, however, by setting a searching window, processings of the embodiment can be carried out. Namely, by including the size, (chronorosical) position, etc., of the searching window in the recognition-related information of a case of the image data, similar processings can be realized.

Operation

Next, operations of a data recognition device according to the embodiment will be described. In the following example, a case for recognizing a facial part from moving image data will be described as an example. The control portion 1 of the data recognition device of the embodiment, first, resets a variable F to count frames to "0" (step 301). Then, with the entire region of image data of an F-th frame of moving image data inputted via the input/output portion 3 as a target, a processing to detect a facial portion is carried out by a predefined method (step 302). As this processing, various processings can be utilized, such as specifying a facial part candidate by a simple method utilizing the quantity of entropy and, while using the specified facial part candidate as a target, carrying out a face detection utilizing a database obtained by learning.

The control portion 1 checks if a facial part has been detected in this step 302 (step 303), increments F (step 304) if a face has not been detected (if No), and returns to step 302 to continue processing. That is, frames are searched in order until a facial part is specified.

In addition, when it is determined that a facial part has been detected in step 303, the control portion 1 increments F (step 305), obtains information to specify the position, size, tilt, etc., of a facial part of the preceding recognition in step 302 or a recognizing process of step 307 (which will be described later), and sets recognition processing conditions by using the obtained information as recognition-related information (step 306).

The control portion 1 next starts a recognizing processing at a region (focusing region) delimited by the preceding position, size, tilt, etc., of a facial part, determines whether or not the facial part exists within a focusing region after a deformation while carrying out a deformation for each degree of freedom such as a shift (equivalent to the degree of freedom for position) and a rotation, and executes a face detection processing (step 307).

The control portion 1 next checks if a face has been recognized and detected in step 307 (step 308) and returns, if detected (if Yes), to step 305 to continue processing.

Namely, as long as a facial part is continuously recognized from each frame, the control portion 1 carries out a processing to recognize a facial part in the next frame while using the conditions for the preceding recognition as an origin.

On the other hand, if it is determined that a face has not been detected (if No) in step 308, the number of renewal times of the recognizing conditions is checked and if a processing of step 310 (which will be described later) has been carried out a predetermined number of times (prescribed number of times) is checked (step 309). Herein, if it has not repeated the prescribed number of times (if No), the recognizing conditions are renewed by a predefined method (step 310), and the operation returns to step 307 to continue processing.

As the processing of step 310, a processing to set a processing parameter so as to enlarge the searching range of a facial part in a recognition processing in step 307 can be mentioned, for example.

On the other hand, in step 309, if the predefined number of times has been repeated (if Yes), the operation shifts to step 302 to again carry out a face detection processing for the entire region of a target.

Advantages of the Embodiment

By such a configuration as in the embodiment, when, for example, a facial part is continuously recognized from moving image data, by determining conditions at the start of searching based on the preceding searching result (so called processing history), the actual searching range is narrowed, and the individual searches are carried out by a processing the same as usual, therefore, compared to the case where a local change in the matching is utilized as in the prior art, misjudgment of a non-facial part as a facial part is prevented. Namely, in the embodiment, information utilized for normalization, such as a position, etc., of a facial part included in each still image of moving image data, is determined based on the result of normalization of frame(s) before the frame in process. Thereby, the processing load for normalization is lightened, from data of moving images which change in time series with continuity, a predefined part can be recognized in a short time, thus a real time processing becomes possible.

Herein, for the samples for making the recognizing processing portion 12 learn, a setting has been provided such as, for the rotation angle, from −180 degrees to 180 degrees and, for the shifting amount, with intervals of 6 pixels as shown in FIG. 8. However, in, for example, a case where the elapse of time between respective frames of moving images is relatively short, movement of a human face can be assumed where it changes only extremely slightly in any one of the degrees of freedom for rotation and shift. In such a case, distribution of the learning samples can be made narrower. Such a distribution can be determined according to the time interval of a recognition target part. For example, when a moving image is the processing target, it may be determined based on its frame-to-frame time (number of frames). Namely, thereby, even when the degree of freedom of deformation is great, data for normalization can be learned and obtained within a reasonable time.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A data recognition device for intermittently specifying, from a time series of target data, predetermined recognition target data parts, the data recognition device comprising:
  a specifying unit that specifies a part of the target data as a focusing part;
  a calculating unit that calculates, with a first calculation rule defined by use of preset reference data, a degree of similarity between the focusing part and the reference data;
  a recognizing unit that determines, based on the degree of similarity, whether or not the focusing part is a recognition target data part; and
  a storing unit that stores information concerning a second calculation rule and information to specify the focusing part, the second calculation rule based on a result of the recognizing unit, when the recognizing unit determines that the focusing part is the recognition target data part,
  wherein at least one of the specifying unit and the calculating unit uses the information stored in the storing unit for processing a next one of the target data in the time series.

2. The data recognition device according to claim 1, wherein the calculation unit calculates the degree of similarity by repeatedly carrying out processes (1) and (2) of:
  (1) provisionally calculating the degree of similarity between the focusing part and the reference data; and
  (2) deforming the focusing part by at least one predetermined deformation degree of freedom based on a result of the provisional calculation, to form a new focusing part and setting the focusing part after the deformation processing to be the same as the new focusing part,
  until the provisionally calculated degree of similarity satisfies a predetermined condition or a number of repeated times exceeds a predefined number of times,
  wherein the recognition unit determines, when the provisionally calculated degree of similarity satisfies the predetermined condition, based on the provisionally calculated degree of similarity, whether or not the focusing part is the recognition target data part, and
  wherein the storing unit stores information to specify a contents of the deformation process, as the information concerning the calculation rule.

3. The data recognition device according to claim 2, wherein the calculation unit, when carrying out the process (2), carries out processes of:
  obtaining a plurality of deformation processing results by deforming the focusing part by at least two mutually different deformation degrees of freedom;
  selecting, out of the plurality of deformation processing results, one deformation processing result based on a predefined selecting rule to form a new focusing part; and
  setting, as the selected deformation processing result, the focusing part after the deformation processing to be the same as the new focusing part.

4. A data recognition device for specifying, from a time series of target data, predetermined recognition target data parts, the data recognition device comprising:
  a selecting unit that selects, from the series of target data, one piece of target data;
  a specifying unit that specifies at least a part of the selected target data as a focusing part;
  a calculating unit that calculates, by a first calculation rule defined by use of preset reference data, a degree of similarity between the focusing part and the reference data;
  a recognizing unit that determines, based on the degree of similarity, whether or not the focusing part is a recognition target data part; and
  a storing unit that stores information concerning a second calculation rule and information to specify the focusing part, the second calculation rule based on a result of the recognizing unit,
  wherein at least one of the specifying unit and the calculating unit uses the information stored in the storing unit for processing a next one of target data in the time series.

5. A data recognition method for intermittently specifying, from a time series of target data, predetermined recognition target data parts, the method, executed by a computer, comprising:
  specifying a part of the target data as a focusing part;
  calculating a degree of similarity between the focusing part and preset reference data with a first calculation rule defined by use of the preset reference data;
  determining, based on the degree of similarity, whether or not the focusing part is a recognition target data part; and
  storing information concerning a second calculation rule and information to specify the focusing part, the second calculation rule based on whether the focusing part is determined to be the recognition target data part,
  wherein in at least one of the information to specify the focusing part and the calculation rule stored in the storing unit is used for processing a next one of the target data in the time series.

6. A computer readable medium storing a data recognizing computer program for causing a computer to execute process for intermittently specifying, from a time series of target data, predetermined recognition target data parts, the process comprising:
  specifying a part of the target data as a focusing part;
  calculating a degree of similarity between the focusing part and preset reference data with a first calculation rule defined by use of the preset reference data;

determining, based on the degree of similarity, whether or not the focusing part is a recognition target data part; and storing information concerning a second calculation rule and information to specify the focusing part, the second calculation rule based on whether the focusing part is determined to be the recognition target data part, wherein in at least one of the information to specify the focusing part and the calculation rule stored in the storing unit is used for processing a next one of the target data in the time series.

* * * * *